No. 771,830. PATENTED OCT. 11, 1904.
A. B. RICE.
CULINARY BOILER OR STEAMER.
APPLICATION FILED JUNE 29, 1904.
NO MODEL.

Witnesses:
Alberta Adamick

Inventor:
Alfred B. Rice
By
Attys.

No. 771,830. Patented October 11, 1904.

UNITED STATES PATENT OFFICE.

ALFRED B. RICE, OF RACINE, WISCONSIN.

CULINARY BOILER OR STEAMER.

SPECIFICATION forming part of Letters Patent No. 771,830, dated October 11, 1904.

Application filed June 29, 1904. Serial No. 214,586. (No model.)

*To all whom it may concern:*

Be it known that I, ALFRED B. RICE, a citizen of the United States, and a resident of the city and county of Racine, in the State of Wisconsin, have invented certain new and useful Improvements in Culinary Boilers or Steamers, of which the following is a full, clear, and exact description.

The present invention has relation more particularly to that class of culinary boilers or steamers commonly known as "double" boilers; and the object of the invention is to provide an improved boiler whereby the cooking or sterilizing of food products of any description may be simply and effectively accomplished.

The invention consists in the features of novelty hereinafter described, illustrated in the accompanying drawings, and more particularly pointed out in the claims at the end of this specification.

Figure 1:
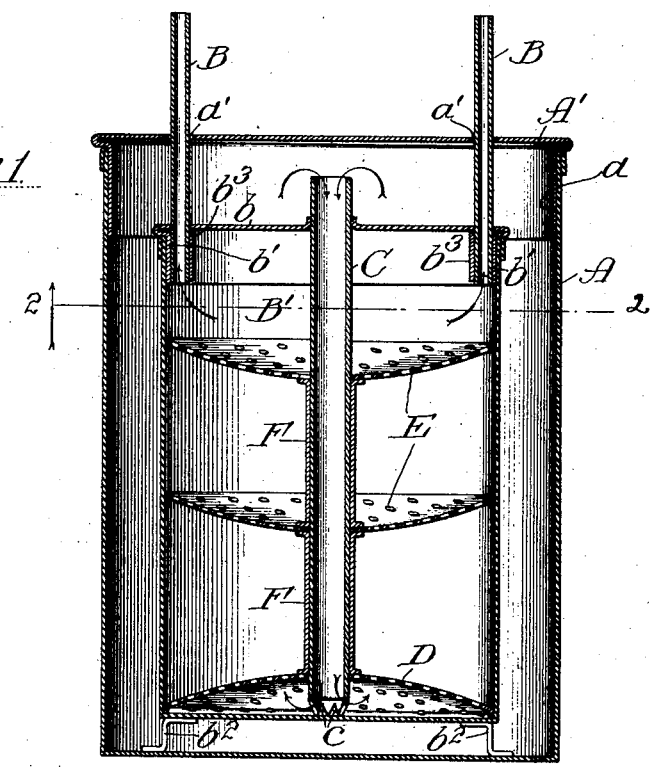
Figure 2:
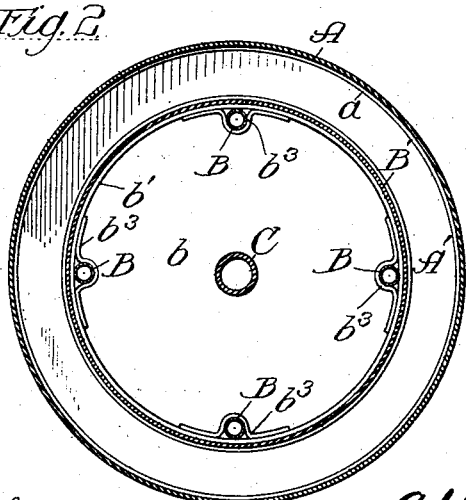

Figure 1 is a view in central vertical section through a boiler embodying my invention. Fig. 2 is a view in cross-section on line 2 2 of Fig. 1 looking in the direction of the arrow there shown.

A designates the outer casing or boiler that will contain the water or other liquid to be converted into steam, this outer casing being formed of cylindrical or other desired shape and of aluminium, tin, or other suitable material. The outer casing A is provided with a cover A', having a depending flange $a$, adapted to sit within the top of the casing A. This flange $a$ of the cover A' is preferably formed with a slight bevel or taper, so that it shall fit steam-tight and yet removably within the top of the casing A. The cover A' is provided with a plurality of holes $a'$, through which will pass a corresponding number of steam-discharge pipes B, the lower ends of these pipes B fitting within holes formed in the cover $b$ of the inner casing or receptacle B'. The pipes B are preferably four in number and are disposed at different points about the cover $b$ in order to secure a more general and effective distribution of the steam throughout the mass being sterilized or cooked, as will presently more fully appear.

The cover $b$ is shown as provided with a depending flange $b'$, adapted to fit snugly within the top of the inner casing or receptacle B', and the lower ends of the pipes B preferably extend through the cover $b$ at points adjacent the flange $b'$ and may be securely held in position by metal straps $b^3$, the ends of which are soldered or otherwise connected to the flange $b'$, as clearly shown in Fig. 2 of the drawings. The bottom of the inner vessel or receptacle B' is provided with feet $b^2$ or with other suitable means for holding it above the bottom of the outer casing or vessel A. In the cover $b$ of the inner vessel B', and preferably at the center of the cover, is formed a hole through which passes the upper end of a tube or pipe C, the lower end of this pipe resting, preferably, against the bottom of the inner vessel B' and being provided at its lower end with slots or holes $c$ for the passage of steam. Adjacent the bottom of the inner vessel B' is set a perforated or foraminous plate D, that may be of inverted concavo-convex shape, as shown, the purpose of this plate D being to hold the mass of material to be sterilized or cooked at a slight distance above the bottom of the vessel B', so that the steam discharging through the slots or perforations at the lower end of the pipe C may better permeate and more uniformly rise through the mass of material within the vessel B'.

From the above-described construction and arrangement of parts it will be seen that in using my invention the vessel A will first be partially filled with water. The inner vessel B', with the material to be sterilized or cooked placed therein, will then be set within the outer vessel A, the cover $b$ being upon the vessel B' and the pipe C being in the position shown. The cover A' of the outer casing or vessel A will then be set in position shown in Fig. 1, with the pipes B projecting through the cover. If now the vessel A be set over the fire or otherwise heated, so as to generate steam from the water contained in the vessel A, it will be found that the steam thus generated will pass in the direction of the arrows, Fig. 1—that is to say, first down through the pipe C, then out through the slots or holes c at the bottom of this pipe, then beneath the perforated plate D, then up through the mass of material contained within the vessel B', and finally out through the several pipes B to the atmosphere.

If the material to be sterilized or cooked is of such character that it will tend to pack or settle materially during the sterilizing or cooking operation, I prefer to provide the interior of the inner vessel B' with one or more perforated shelves or supporting-plates E. As shown, these plates E are of inverted concavo-convex shape and are adapted to slip loosely over the pipe C. The plates E may be held at suitable distances apart by means of spacing sleeves or thimbles F, that slip over the pipe C. The perforated shelves or supporting-plates E, serving, as they do, to hold the mass of material within the vessel B' in separate portions, aid materially in preventing the packing of the mass within the vessel B', and hence enable the steam to more readily and uniformly permeate the mass of material within the vessel B' as it ascends to the pipes B. By forming the supporting shelves or plates of concavo-convex shape greater strength is given thereto. Preferably the steam tube or pipe C is separable from the cover B, so that the various parts may be more readily cleaned. By disposing the escape-pipes B at different points around the top or cover of the vessel B' it will be seen that a more uniform distribution of the steam throughout the mass of material within the vessel B' is effected than would be possible if a single vent-pipe were used, since with a single pipe there would be a tendency of the steam to rise in a direct course or channel from the bottom of the pipe C, and hence a large part of the material within the vessel B' would not be so thoroughly disposed to the action of the steam.

It is manifest that the precise details of construction above set out may be varied without departure from the scope of the invention.

So far as I am aware this invention presents the first instance of a boiler of the character described in which there is provided a casing or compartment for containing the fluid to be converted into steam, the upper part of this casing or compartment being in communication with the upper end of a steam-pipe that leads downward into the inner vessel in order to deliver steam to the lower part of the material within said inner vessel and in which there is a vent pipe or pipes for leading the steam away from the inner vessel to the atmosphere.

Having thus described my invention, what I claim as new, and desire to secure by Letters Patent, is—

1. A boiler of the character described comprising a casing for containing fluid to be converted into steam, a vessel for containing the material to be cooked or sterilized, an open-ended steam-pipe leading downward from the upper part of said vessel to approximately the bottom thereof, said open-ended pipe being in communication with said casing and a vent-pipe leading from the upper part of said vessel to the atmosphere.

2. A boiler of the character described comprising an outer casing, an inner vessel of smaller diameter adapted to sit within said outer casing and having a cover, an open-ended steam-pipe leading downward from the top of said inner vessel and a vent-pipe leading from the top of said inner vessel through the outer vessel.

3. A boiler of the character described comprising an outer casing, an inner vessel of smaller diameter adapted to sit within said outer casing and having a cover, an open-ended steam-pipe leading downward from the top of said inner vessel to approximately the bottom thereof and provided at its lower end with slots or openings, and a plurality of vent-pipes leading from the top of said inner vessel through the top of the outer vessel.

4. A boiler of the character described comprising an outer casing, an inner vessel adapted to sit within said outer casing and having a cover, an open-ended steam-pipe leading downward from a hole in the cover of said inner vessel to approximately the bottom of said vessel, a perforated or foraminous plate within said inner vessel beneath which plate said steam-pipe is arranged to deliver steam and one or more vent-pipes connecting the upper part of said inner vessel to the atmosphere.

5. A boiler of the character described comprising an outer casing having a perforated, removable cover, an inner vessel of smaller diameter adapted to sit within said outer casing and having a cover, an open-ended steam-pipe leading downward from the cover of said inner vessel to about the bottom of said vessel and a vent-pipe leading from the top of said inner vessel through the perforated cover of the outer vessel.

6. A boiler of the character described comprising an outer casing having a perforated cover, an inner vessel of smaller diameter adapted to sit within said outer casing and removably sustained therein and having a perforated cover, an open-ended steam-pipe leading downward from the perforated cover of said inner vessel to approximately the bottom of said vessel, and vent-pipes leading from the perforated cover of said inner vessel through the perforated cover of said outer casing.

7. A boiler of the character described comprising an outer casing, an inner vessel of smaller diameter adapted to sit within said outer casing and having a cover, a plurality of perforated plates arranged within said inner vessel and held at distances apart, an open-ended steam-pipe leading downward from the top of said inner vessel and through said perforated plates, and one or more vent-pipes leading from the top of said inner vessel through the cover of said outer vessel.

ALFRED B. RICE.

Witnesses:
GEO. P. FISHER, Jr.,
ALBERTA ADAMICK.